United States Patent
Osaki

(10) Patent No.: US 11,010,393 B2
(45) Date of Patent: May 18, 2021

(54) LIBRARY SEARCH APPARATUS, LIBRARY SEARCH SYSTEM, AND LIBRARY SEARCH METHOD

(71) Applicant: Hitachi, Ltd., Tokyo (JP)

(72) Inventor: Hiroyuki Osaki, Tokyo (JP)

(73) Assignee: HITACHI, LTD., Tokyo (JP)

(*) Notice: Subject to any disclaimer, the term of this patent is extended or adjusted under 35 U.S.C. 154(b) by 144 days.

(21) Appl. No.: 16/331,521

(22) PCT Filed: Apr. 6, 2017

(86) PCT No.: PCT/JP2017/014311
§ 371 (c)(1),
(2) Date: Mar. 7, 2019

(87) PCT Pub. No.: WO2018/185899
PCT Pub. Date: Oct. 11, 2018

(65) Prior Publication Data
US 2019/0205299 A1    Jul. 4, 2019

(51) Int. Cl.
*G06F 7/00* (2006.01)
*G06F 16/2458* (2019.01)
(Continued)

(52) U.S. Cl.
CPC .......... *G06F 16/2465* (2019.01); *G06F 16/00* (2019.01); *G06F 16/248* (2019.01)

(58) Field of Classification Search
CPC ................ G06F 16/2465; G06F 16/248
(Continued)

(56) References Cited

U.S. PATENT DOCUMENTS

| | | |
|---|---|---|
| 8,060,553 B2 | 11/2011 | Mamou et al. |
| 2004/0260696 A1 | 12/2004 | Matsuoka et al. |
| 2015/0356085 A1* | 12/2015 | Panda ............... G06N 5/04 707/748 |

FOREIGN PATENT DOCUMENTS

JP    2005-011109 A    1/2005

OTHER PUBLICATIONS

Takao Okubo "A Proposal of a Dynamic Testing Method of Security Implementation with Context Rules" Computer Security Symposium 2010; English abstract provided; Oct. 22, 2010; 9 pages.

* cited by examiner

*Primary Examiner* — Isaac M Woo
(74) *Attorney, Agent, or Firm* — Procopio, Cory, Hargreaves & Savitch LLP

(57) ABSTRACT

A computer 101 for searching a library to be used for an application to be used for a data analysis includes a memory 103 for storing information and a CPU 102 connected to the memory 103. The memory 103 stores execution result information including information for specifying a library utilized for a data analysis in the past and a past analysis data statistical profile which is a statistical profile with respect to past analysis data on which the data analysis is performed by using the library. The CPU 102 specifies an analysis target data statistical profile which is a statistical profile with respect to analysis target data that is a data analysis object, specifies an effectiveness degree indicating effectiveness of utilization of the analysis target data for the data analysis with respect to the library based on a similarity between the past analysis data statistical profile of the past analysis data on which the data analysis is performed by using the library and the analysis target data statistical profile, and preferentially outputs information relating to a library where effectiveness is high.

14 Claims, 19 Drawing Sheets

(51) Int. Cl.
*G06F 16/00* (2019.01)
*G06F 16/248* (2019.01)
(58) Field of Classification Search
USPC .................................................. 707/600–899
See application file for complete search history.

| RESULT ID (501) | ANALYSIS TYPE (502) | INPUT DATA STATISTICAL PROFILE (503) | | | PRE-PROCESSING LIBRARY ID (504) | CORE ANALYSIS LIBRARY ID (505) | POST-PROCESSING LIBRARY ID (506) | EVALUATION VALUE (507) | EXECUTION TIME (508) |
|---|---|---|---|---|---|---|---|---|---|
| | | DATA STRING NAME | FIRST STATISTICAL VALUE | SECOND STATISTICAL VALUE | | | | | |
| 1 | MULTIPLE REGRESSION ANALYSIS | a | AVERAGE VALUE 10 | MEDIAN VALUE 15 | LIBRARY z | R | | 0.5 | Xx:xx:xx |
| 2 | MULTIPLE REGRESSION ANALYSIS | a | AVERAGE VALUE 20 | MEDIAN VALUE 30 | LIBRARY x | Excel | | 0.3 | Yy:yy:yy |

*FIG. 4*

| DATA STRING NAME | FIRST STATISTICAL VALUE | | SECOND STATISTICAL VALUE | |
|---|---|---|---|---|
| NUMBER OF STOCKS | AVERAGE VALUE | 10 | MEDIAN VALUE | 15 |
| NUMBER OF STOCKS, NUMBER OF SHIPMENTS | CORRELATION COEFFICIENT | 0.83 | NUMBER OF CLUSTERS | 3 |

FIG. 6

| LIBRARY ID 701 | LIBRARY SCORE 702 |
|---|---|
| UPPER LIMIT VALUE FILTER | 10 |
| PART x | 0 |

| 1001 | 1002 | 1003 |
|---|---|---|
| FIRST APPLICATION BUSINESS TYPE/ TASK IDENTIFIER | SECOND APPLICATION BUSINESS TYPE/ TASK IDENTIFIER | BUSINESS TYPE/TASK CLOSENESS SCORE |
| CONVENIENCE STORE/ SALES IMPROVEMENT | FAMILY RESTAURANT/ SALES IMPROVEMENT | 20 |
| CONVENIENCE STORE/ SALES IMPROVEMENT | MANUFACTURING/ STOCK ELIMINATION | 0 |
| FAMILY RESTAURANT/ SALES IMPROVEMENT | MANUFACTURING/ STOCK ELIMINATION | 0 |

| ANALYSIS TYPE (1301) | CORE ANALYSIS LIBRARY ID (1302) |
|---|---|
| TREND ANALYSIS | R MULTIPLE REGRESSION ANALYSIS LIBRARY |
| TREND ANALYSIS | Python CLUSTER ANALYSIS LIBRARY |

FIG. 16

| | | |
|---|---|---|
| 1400 | | |
| CORE ANALYSIS LIBRARY ID /1401 | INPUT DATA CONDITION /1402 | OUTPUT DATA CONDITION /1403 |
| R MULTIPLE REGRESSION ANALYSIS | \| [AVERAGE VALUE]-[MEDIAN VALUE] \| < [STANDARD DEVIATION] | NUMBER OF OVERLAPPING LINES = 0 |

| LIBRARY ID 1501 | INPUT DATA STATISTICAL PROFILE 1502 | | | | OUTPUT DATA STATISTICAL PROFILE 1503 | | | | PREDICTED EFFECT EXPRESSION 1504 |
|---|---|---|---|---|---|---|---|---|---|
| | FIRST STATISTICAL VALUE | | SECOND STATISTICAL VALUE | | FIRST STATISTICAL VALUE | | SECOND STATISTICAL VALUE | | |
| UPPER LIMIT FILTER | AVERAGE VALUE | 10 | MEDIAN VALUE | 15 | AVERAGE VALUE | 10 | MEDIAN VALUE | 12 | MEDIAN VALUE (input) - MEDIAN VALUE (output) = 3 |
| DEDUPLICATION FILTER | NUMBER OF OVERLAPPING LINES | 32 | | | NUMBER OF OVERLAPPING LINES | 0 | | | NUMBER OF OVERLAPPING LINES (output) = 0 |

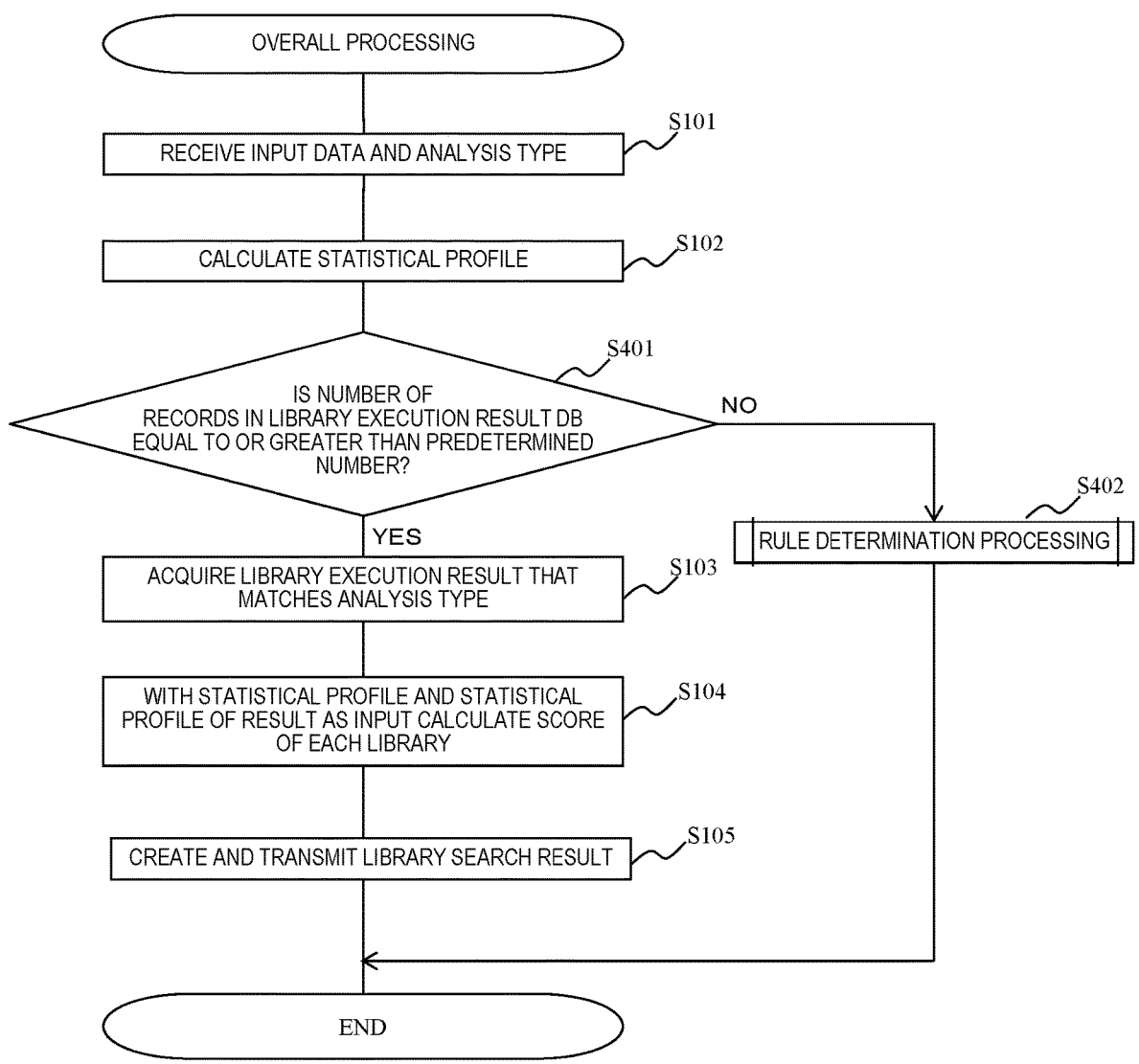

LIBRARY SEARCH APPARATUS, LIBRARY SEARCH SYSTEM, AND LIBRARY SEARCH METHOD

CROSS-REFERENCE TO RELATED APPLICATIONS

This application is a U.S. National Stage entry of PCT Application No: PCT/JP2017/014311 filed Apr. 6, 2017, the contents of which are incorporated herein by reference.

TECHNICAL FIELD

The present invention relates to a library search apparatus and the like for searching a library to be utilized for a data analysis.

BACKGROUND ART

At present, in order to improve management of a company, the importance of a system of engagement (SoE), which obtains a hint for increasing business efficiency and improving the flexibility of business plan by acquiring and analyzing records of business processes from information system supporting the business processes as data, is increasing.

An application for automating processing of a data analysis is implemented using data analysis libraries by data scientists. The data analysis libraries are more than 4,000 published only as open source.

Several techniques for searching the data analysis libraries utilized by the data scientists for the data analysis are known from such a large amount of data analysis libraries.

For example, PTL 1 discloses a technique capable of searching each module stored in a registry with a module name.

In addition, PTL 2 discloses a technique of searching for a job having a high degree of coincidence of a data item attribute from a job information table in order to search re-utilizable ETL (extract, transform, load) processing.

CITATION LIST

Patent Literature

PTL 1: U.S. Pat. No. 8,060,553
PTL 2: JP-A-2005-11109

SUMMARY OF INVENTION

Technical Problem

Hereinafter, a specific operation in a case where a data scientist implements a data analysis application will be described.

First, the data scientist selects a core analysis library to be used from among a plurality of core analysis libraries according to the objective analysis purpose.

Input data may include missing values or abnormal values outside the corresponding range, so if such input data is input to the core analysis library directly as it is, there is a possibility that an incorrect output is output. Therefore, a preprocessing library that executes processing to remove missing values and abnormal values from input data is introduced. In this case, the data scientist also selects an appropriate library from among a plurality of preprocessing libraries, and performs settings (for example, the setting of a threshold value in the processing) for the preprocessing library.

In addition, since the output of the core analysis library may include numerical values, character strings, or the like unrelated to the purpose of analysis, a post-processing library is introduced in order to generate an analysis result that extracts necessary information excluding such output. In this case, the data scientist also selects an appropriate library from among a plurality of types of post-processing libraries, and performs settings for the post-processing library.

It is determined that there is no problem in the quality of the data analysis application configured with the core analysis library, the preprocessing library, and the post-processing library, for example, by checking whether the analysis result is accurately output with respect to the input data. Then, the implementation of the data analysis application is completed by confirming that there is no problem in the quality of the data analysis application. Note that, in a case where there is a problem in the quality of the data analysis application, some part of the above-described operation will be reviewed.

In the above-described operation, it is important to properly select the core analysis library, the preprocessing library, and the post-processing library in order to be able to acquire an accurate result suited to the purpose. Such operation is a complicated operation for a novice data scientist.

One of the reasons for complicated operation is that contents of input data differ for each company and information system, and a use result of libraries from other companies cannot be reutilized as they are. Therefore, the preprocessing library and the post-processing library need to be changed according to the contents of input data. In particular, since the novice data scientist often do not fully understand the characteristics of core analysis libraries and the characteristics of libraries that can be applied in preprocessing and post-processing, it is difficult to specify an appropriate preprocessing library or post-processing library, and it may take a long time to find an appropriate preprocessing library or post-processing library.

The present invention has been made in view of the above circumstances, and an object thereof is to provide a technique capable of easily and appropriately searching and outputting a library suitable for a data analysis.

Solution to Problem

In order to achieve the above object, a library search apparatus according to one aspect searches a library to be used for an application to be used for a data analysis. The library search apparatus includes a storage device for storing information and a processor unit connected to the storage device. The storage device stores execution result information including information for specifying a library utilized for a data analysis in the past and a past analysis data statistical profile which is a statistical profile for past analysis data on which the data analysis is performed by using the library. The processor unit specifies an analysis target data statistical profile which is a statistical profile for analysis target data that is a data analysis object, specifies an effectiveness degree indicating effectiveness of utilization of the analysis target data for the data analysis with respect to the library based on a similarity between the past analysis data statistical profile of the past analysis data on which the data analysis is performed by using the library and the analysis target data statistical profile, and preferentially outputs information relating to a library where effectiveness is high.

Advantageous Effects of Invention

According to the present invention, it is possible to easily and appropriately search and output a library suitable for a data analysis.

BRIEF DESCRIPTION OF DRAWINGS

FIG. 3 is a configuration diagram of a library execution result database according to Embodiment 1.

FIG. 4 is a configuration diagram of an input data statistical profile according to Embodiment 1.

FIG. 6 is a configuration diagram of a library search result according to Embodiment 1.

FIG. 12 is a configuration diagram of a business type/task closeness score table according to Embodiment 2.

FIG. 15 is a configuration diagram of a core analysis library correspondence table according to Embodiment 3.

FIG. 16 is a configuration diagram of a core analysis library application rule table according to Embodiment 3.

FIG. 17 is a configuration diagram of a library effect database according to Embodiment 3.

FIG. 18 is a flowchart of entire processing according to Embodiment 3.

DESCRIPTION OF EMBODIMENTS

Several embodiments will be described with reference to the drawings. Note that the embodiments described below do not limit the invention according to the claims, and all the elements and combinations thereof described in the embodiments are not necessarily indispensable for solving means of the invention.

In the following description, information may be described in terms of the representation "AAA table" or "AAA list", but the information may be represented by any data structure. In other words, in order to indicate that the information does not depend on a data structure, "AAA table" or "AAA list" can be called "AAA information".

Further, in the following description, "processor unit" includes one or more processors. At least one processor is typically a microprocessor such as a central processing unit (CPU). Each of the one or more processors may be a single core or a multi-core. The processor may include a hardware circuit that performs some or all of the processing.

In addition, processing by a functional unit configured with a processor executing a program may be performed by the processor, or may be performed by a computer including the processor.

Embodiment 1

Hereinafter, Embodiment 1 will be described.

First, an outline of Embodiment 1 will be described.

Figure 1:
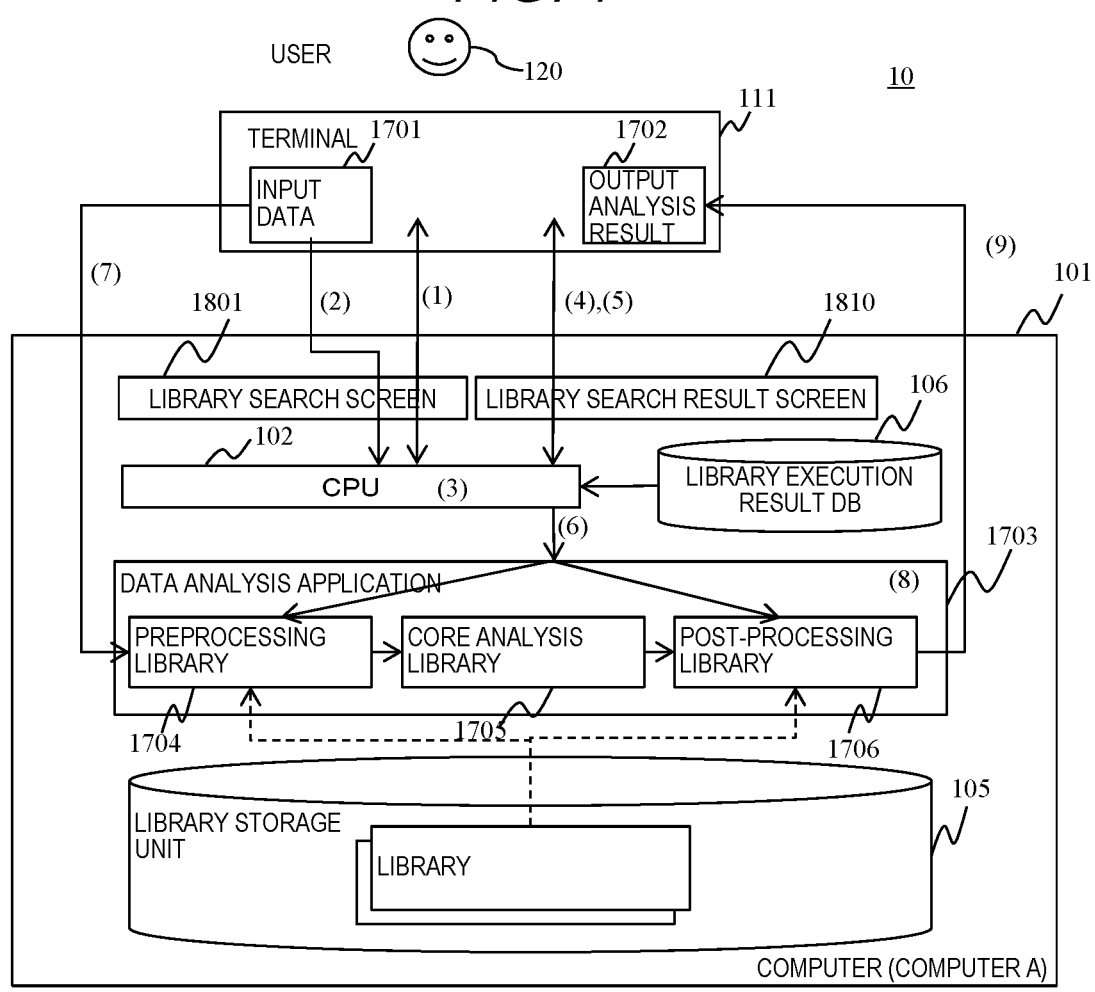
FIG. 1 is a diagram illustrating an outline of Embodiment 1.

FIG. 1 is a diagram illustrating an outline of Embodiment 1.

A data analysis library market place system (hereinafter referred to as a market place system) 10 as an example of a library search system is a system that searches appropriate libraries (preprocessing library, core analysis library, post-processing library, or the like) based on input data and analysis purpose, and provides a search result.

In the market place system 10, a computer 101 (computer A) causes a terminal 111 of a user (searching person: data scientist) 120 to display a library search screen 1801 (see FIG. 7) ((1) of FIG. 1). In the terminal 111, when input data and an analysis purpose is designated by the user 120, a CPU 102 of the computer 101 is notified of the information. The CPU 102 refers to a library execution result database (DB) 106 and calculates a library score (effectiveness degree) indicating effectiveness to which the designated input data and the analysis purpose are utilized with respect to each library ((3) of FIG. 1). Next, the CPU 102 causes the terminal 111 to display a library search result screen 1810 (see FIG. 8) with contents in which information relating to a library having a high calculated library score is prioritized ((4) of FIG. 1). Note that the output of the library search result is not necessarily a screen, and for example, it may be provided as a general application programming interface (API) such as JavaScript (registered trademark) object notation (JSON). The user 120 can figure out an appropriate library and select the library to be used from the library search result screen 1810 displayed on the terminal 111. When the library to be used is selected on the library search result screen 1810 of the terminal 111, the computer 101 is notified of the information of the selected library ((5) of FIG. 1). The CPU 102 of the computer 101 acquires the input data (analysis target data) of the terminal 111 ((7) of FIG. 1), performs a data analysis using a data analysis application 1703 configured with the notified library with respect to the input data 1701 ((8) of FIG. 1), and outputs an analysis result to the terminal 111 ((9) of FIG. 1). In this way, the user 120 can easily create the data analysis application 1703 configured with the appropriate library, and can perform the data analysis of the input data 1701 by using the created data analysis application 1703.

Next, the details of Embodiment 1 will be described.

Figure 2:
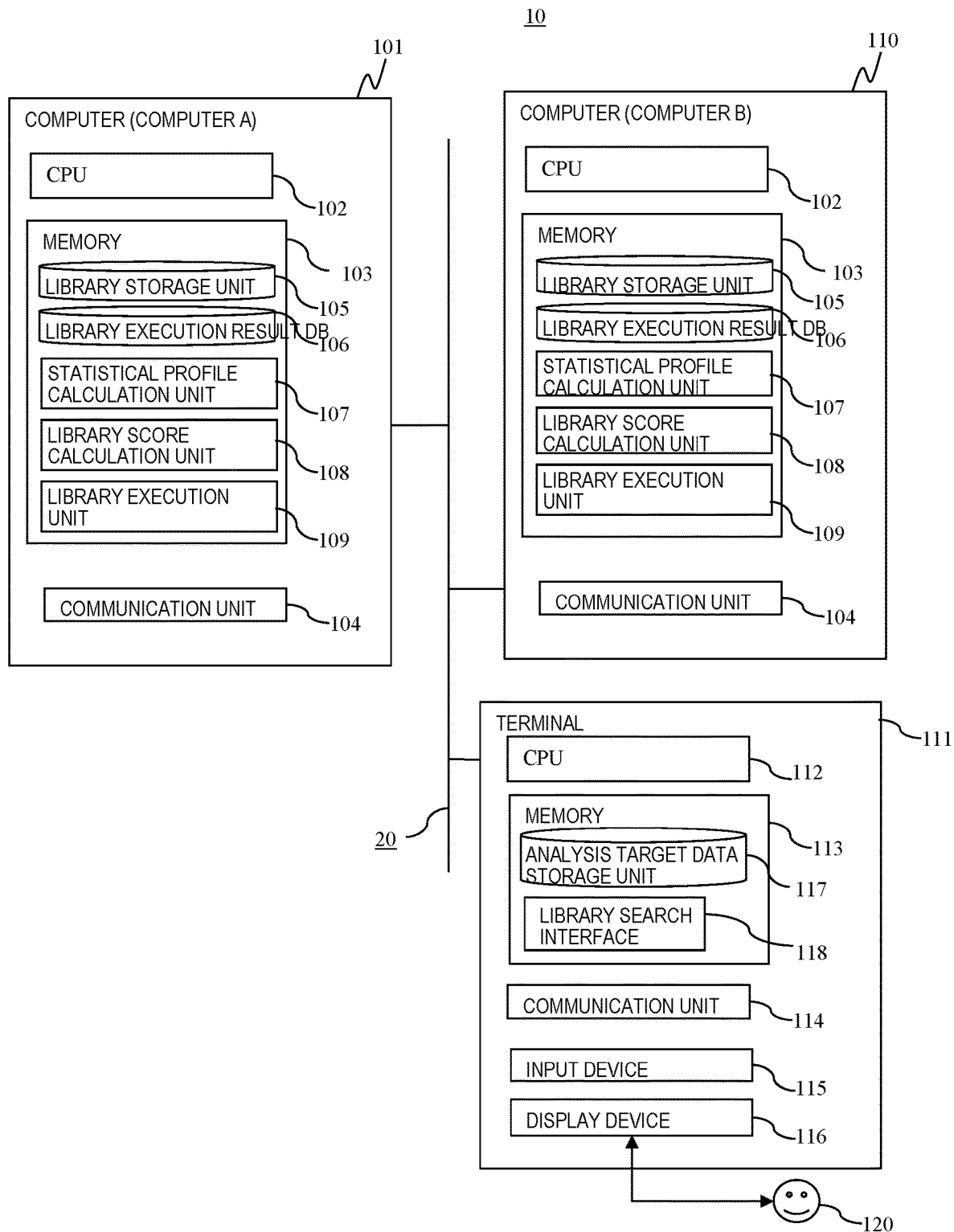
FIG. 2 is an overall configuration diagram of a data analysis library market place system according to Embodiment 1.

FIG. 2 is an overall configuration diagram of the data analysis library market place system according to Embodiment 1.

The market place system 10 includes one or more terminals 111, one or more computers (computer 101 and computer 110), and a network 20 that connects the terminal 111 and the computers (101 or the like) in a communicable manner.

The computer 101 is an example of a library search apparatus and has a function of executing a data analysis application and searching a library (preprocessing library or post-processing library) of a data analysis application. The computer 101 includes a central processing unit (CPU) 102, a memory 103 as an example of a storage device, and a communication unit 104.

The communication unit 104 is, for example, an interface such as a wired LAN card or a wireless LAN card, and communicates with other apparatuses (for example, computer 110, the terminal 111, or the like) via the network 20.

The CPU 102 executes various kinds of processing according to a program stored in the memory 103.

The memory 103 is, for example, a random access memory (RAM), and stores a program executed by the CPU 102 and necessary information. In the present embodiment, the memory 103 stores a library storage unit 105 and a library execution result DB 106. In addition, the memory 103 stores a program constituting each of a statistical profile calculation unit 107, a library score calculation unit 108, and a library execution unit 109, by being executed by the CPU 102.

The library storage unit 105 stores various kinds of libraries to be utilized for analysis processing. The library includes, for example, a core processing library for executing processing that is a core of analysis processing, a preprocessing library for performing preprocessing for input data before the core processing, a post-processing library for performing post-processing for data after the core processing.

The statistical profile calculation unit 107 executes processing that calculates a statistical profile for data that is an object for the analysis processing. Note that the details of the processing of the statistical profile calculation unit 107 will be described later. The library score calculation unit 108 performs processing for specifying a library score (effectiveness degree) indicating effectiveness of utilization of processing target data for a data analysis with respect to the library. Details of the processing by the library score calculation unit 108 will be described later. The library execution unit 109 executes a data analysis application configured with one or more designated libraries for the input data to be processed, and outputs an analysis result to the terminal 111, with respect to the input data to be processed.

The computer 110 is a computer having the same configuration as the computer 101. Note that data of the library execution result DBs 106 may be independently managed by each of the computer 101 and the computer 110, or information in the library execution result DBs 106 may be made to coincide each other by performing an appropriate communication between the computer 101 and the computer 110.

The terminal 111 is a terminal for inputting an instruction to the computer (computer 101, computer 110) by a searching person, outputting an execution result of the data analysis application by the computer or a search result of the library, and developing a data analysis application based on the search result. The terminal 111 includes a CPU 112, a memory 113, a communication unit 114, an input device 115, and a display device 116.

The communication unit 114 is, for example, an interface such as a wired LAN card or a wireless LAN card, and communicates with other apparatuses (for example, computer 101, 110, or the like) via the network 20.

The CPU 112 executes various kinds of processing according to a program stored in the memory 113.

The memory 113 is, for example, a random access memory (RAM), and stores a program executed by the CPU 112 and necessary information. In the present embodiment, the memory 113 stores an analysis target data storage unit 116. The analysis target data storage unit 116 stores data (input data: analysis target data) that is an object where the data analysis is performed. The input data is, for example, a set of data strings holding one or more data strings separated by specific symbols, and may be in a form of a table of a CSV file or a database. The data strings included in the input data include one or more numerical values or character strings relating to specific contents as data, and are associated with, for example, predetermined data string names. It is preferable that the data string names are unique as long as they relate to the same contents. In addition, the memory 113 stores a library search interface 117 that displays the library search screen 1801, library search result screen 1810, or the like and receives an input for the screen by being utilized by the CPU 112.

The input device 115 is, for example, an input device such as a mouse, keyboard, or the like, and receives an input from the user. The display device 116 is, for example, a liquid crystal display, and displays various kinds of screens. In the present embodiment, the library search screen 1801 and the library search result screen 1810 are displayed on the display device 116.

FIG. 3 is a configuration diagram of a library execution result database according to Embodiment 1.

For example, the library execution result DB 106 stores information (execution result information) relating to the results for each execution of the data analysis application in the computer 101 as a record. The library execution result DB 106 has a function of receiving a data request query and outputting some or all the information of the record corresponding to the data request query. The record of the library execution result DB 106 is added by result accumulation processing (see FIG. 11) which will be described later. The record of the library execution result DB 106 includes fields of a result ID 501, an analysis type 502, an input data statistical profile 503, a preprocessing library ID 504, a core analysis library ID 505, a post-processing library ID 506, an evaluation value 507, and an execution time 508.

In the result ID 501, an ID (result ID) uniquely indicating the result of one time is stored. In the analysis type 502, a name representing an analysis purpose (for example, "multiple regression analysis", "decision tree", or the like) when data analysis is performed, is stored. In the input data statistical profile 503, a statistical profile (past analysis data statistical profile) of the data (past analysis data) input in the data analysis, is stored. The content of the statistical profile is the same as the input data statistical profile shown in FIG. 4. The details will be described later. A plurality of input data statistical profiles 503 may be provided in one record. For example, when two data strings a and b are included in the input data, an input data statistical profile 503 for a statistical profile relating to the data string a, an input data statistical profile 503 for a statistical profile relating to the data string b, and an input data statistical profile 503 for a statistical profile (correlation, number of clusters, or the like) between the data strings a and b may be provided. In the preprocessing library ID 504, an ID (preprocessing library ID) of the library on which the preprocessing in the data analysis application is performed, is stored. In the core analysis library ID 505, an ID (core analysis library ID) of the library on which the core analysis in the data analysis application is performed, is stored. In the post-processing library ID 506, an ID (post-processing library ID) of the library on which the post-processing in the data analysis application is performed, is stored. In the evaluation value 507, an evaluation value for the data analysis by the data analysis application is stored. For example, the evaluation value may be set by the user who performed the data analysis. In the execution time 508, the time when the data analysis is executed by the data analysis application, is stored.

FIG. 4 is a configuration diagram of an input data statistical profile according to Embodiment 1.

An input data statistical profile 401 is information (corresponding to the analysis target data statistical profile) temporarily created in the memory 103 by the statistical profile calculation unit 107. One or more records are stored in the input data statistical profile 401. The record of the input data statistical profile 401 has fields of a data string name 402, a first statistical value 403, and a second statistical value 404. Note that three or more statistical value fields may be provided in the record. In the data string name 402, names of a character string type for specifying one or more data strings included in the input data are stored. Note that it may also be possible to prepare another table in which the names of the data string are associated with IDs and store the IDs in the data string name 402. In this case, by referring to another table, it is possible to acquire the name of the data string corresponding to the ID. The first statistical value 403 includes fields of a statistical value type 403A and a result 403B. In the statistical value type 403A, the type of statistical value is stored. In the result 403B, a statistical value of the statistical value type for the data string of the data string name of the data string name 402 in the record, is stored. The second statistical value 404 includes fields of a statistical value type 404A and a result 404B. In the statistical value type 404A, a type of a statistical value different from the statistical value type 403A is stored. In the result 404B, a statistical value of the statistical value type for the data string of the data string name of the data string name 402 in the record, is stored.

The first statistical value 403 and the second statistical value 404 store the results of statistical processing by the statistical profile calculation unit 107. For example, when a data string corresponding to the data string name "number of stocks" exists in the input data and 8, 12, 10, . . . are included as the numerical value, "number of stocks" that uniquely indicates the data string is stored in the data string name 402. Further, in this case, the statistical profile calculation unit 107 executes, for example, statistical processing for calculating an average value and statistical processing for calculating a median value with respect to the numerical values included in the data string corresponding to "number of stocks". Thereafter, in the statistical value types 403A and 404A, character strings of "average value" and "median value" meaning the statistical processing thereof are stored, and in the results 403B and 404B, a statistical value as a result of applying the statistical processing, that is "10" which is the result of an average value calculation is stored in the result 403B and "15" which is the result of a median value calculation is stored in the result 404B.

Further, for example, when there are data strings corresponding to data string names "number of stocks, and number of shipments" in the input data, "number of stocks, and number of shipments" which uniquely indicate the data strings are stored in the data string name 402. In this case, the statistical profile calculation unit 107 calculates, for example, a correlation coefficient in two data strings as the statistical processing for numerical values included in the data strings corresponding to "number of stocks, and number of shipments", and as a result, "0.83" is obtained. Thereafter, "correlation coefficient" is stored in the statistical value type 403A and "0.83" is stored in the result 403B. In addition, the number of clusters for the data is detected and "3" is obtained as a result, and "number of clusters" is stored in the statistical value type 404A and "3" is stored in the result 404B.

The statistical value type for performing the statistical processing is not limited to the above description, and may be any type as long as the statistical value type indicates a statistical feature of the input data.

Figure 5:
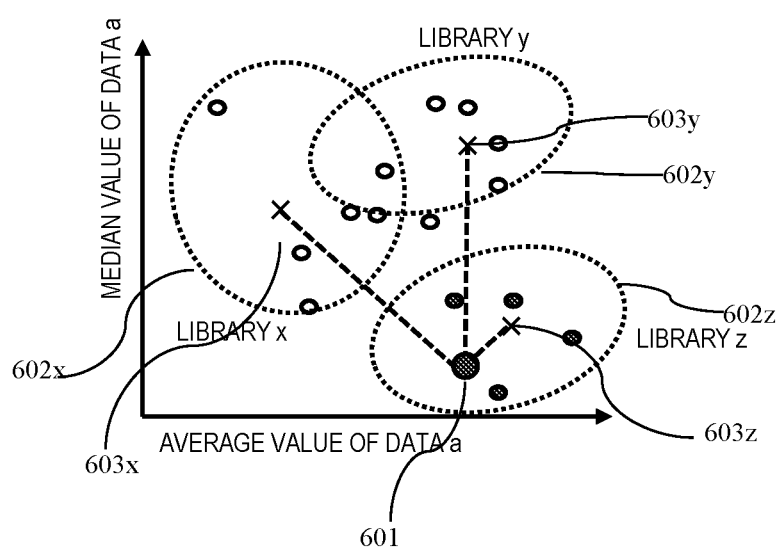
FIG. 5 is a diagram illustrating a method of determining a closeness between an input data statistical profile and a statistical profile group processed by a library based on the statistical profile group and the input data statistical profile in the library execution result DB according to Embodiment 1.

FIG. 5 is a diagram illustrating a method of determining a closeness (similarity) between the input data statistical profile and a statistical profile group processed by the library based on the statistical profile group in the library execution result DB and the statistical profile of the input data according to Embodiment 1. In FIG. 5, a plurality of statistical profile results of the library execution result DB 106 and the statistical profile of the input data are plotted with respect to a scatter diagram obtained by taking two statistical values of the average value (first statistical value) and the median value (second statistical value) of the data string a in two axes.

A point 601 in FIG. 5 represents the input data statistical profile. Further, the other points (white circles, black circles) in FIG. 5 represent the plurality of statistical profile results of the library execution result DB 106. In addition, areas 602x, 602y, and 602z represent areas where points corresponding to the statistical profile results applied to the preprocessing of libraries of library x, library y, and library z, respectively exist. Coordinates 603x, 603y, and 603z represent a gravity center of the statistical values of statistical profile results applied to the preprocessing of the library x, the library y, and the library z, respectively.

As an example of a method of determining a library applied to a statistical profile close to the input data statistical profile (point 601) by the library score calculation unit 108, it can be realized by determining whether or not the input data statistical profile (point 601) is included in an area of the statistical profile group to which library is applied. For example, in the example of FIG. 5, since the point 601 is included in the area 602z of the statistical profile group to which the library z is applied and is not included in the area of the statistical profile group to which other libraries are applied, the library score calculation unit 108 determines that the library z is applied to the statistical profile group close to the input data statistical profile. In this case, the library score calculation unit 108 performs processing for calculating a score by adding a score (library score) of the library z by a predetermined value (for example, ten).

As a method of calculating the score of the library by the library score calculation unit 108, for example, a distance from a gravity center of each area is calculated with respect to the input data statistical profile (point 601), and when the gravity center closest to the distance is the coordinate 603z of the area 602z, the score may be calculated by adding the score of the library z having the coordinate 603z as the gravity center by a predetermined value (for example, ten). Further, the library score calculation unit 108 may calculate reciprocal of distances between the input data statistical profile (point 601) and each gravity center, and use the calculated value as a score (library score) of each library. In this way, it is possible to assign a high score to a library applied to the statistical profile belonging to an area whose gravity center is close by the input data statistical profile (point 601).

Further, the library score calculation unit 108 may calculate a library score with a gravity center of each area as a gravity center GC (x, y) calculated by a weighted average as shown in the following expression (1) instead of a simple average of the statistical values.

$$GC(x, y) = \left( \frac{1}{n} \times \sum_{i=1}^{n} x_i \alpha_i, \frac{1}{n} \times \sum_{i=1}^{n} y_i \alpha_i \right) \quad (1)$$

Where, $x_i$ indicates a first statistical value of each statistical profile belonging to an area, $y_i$ indicates a second statistical value of each statistical profile, $\alpha_i$ indicates an evaluation value (a value of the evaluation value 507) for each library, and n indicates a total number of statistical profiles belonging to the area.

In the above example, the calculation for determining the closeness between the input data statistical profile and the statistical profile group processed by the libraries by the library score calculation unit 108 using two kinds of statistical values of a single data string called data string a, has been described. A cluster analysis in multidimensional (three or more dimensions) using statistical profiles for a plurality of data strings may be performed to determine a closeness between the input data statistical profile and the statistical profile group processed by the libraries. Note that there is a case where the data string name of the result (for example, data string a) and the data string name of the input data are different with respect to the data representing the same content (for example, when one is in English notation, the other is in Japanese notation, or the like). In this case, for example, in order to equalize the data string name with respect to the data representing the same content, a conversion rule for converting the data string name of the data having the same content to the same data string name may be stored in the memory 103, the data string name may be converted using the conversion rule, and processing for determining the library applied to the statistical profile close to the input data statistical profile (point 601) may be performed by using the statistical profile corresponding to data string name after the conversion.

FIG. 6 is a configuration diagram of a library search result according to Embodiment 1.

A library search result 700 is an example of an output format of a score calculation result by the library score calculation unit 108. A library search result screen, which will be described later, is created based on the library search result 700.

The library search result 700 stores a record including fields of a library ID 701 and a library score 702 for each library extracted by the library score calculation unit 108. The library ID is stored in the library ID 701. In the library score 702, the library score of the library corresponding to the record is stored. Note that the library score calculation unit 108 may extract only a library in which a library score equal to or greater than a predetermined value is calculated, and store the library in the library search result 700, or extract a predetermined number of libraries with a high rank library score and store only the record corresponding to the library in the library search result 700. In the present embodiment, in the library search result 700, a record corresponding to a library with a high library score is sorted so as to be high rank (front of the order).

For example, the record of a first line of the library search result 700 indicates that the library whose library ID is "upper limit value filter" has the library score "10", and the record of a second line indicates that the library whose library ID is "part x" has the library score "0". The library of "upper limit value filter" indicates that the effectiveness is higher in the analysis processing of the input data.

Next, a screen displayed on the terminal 111 will be described.

Figure 7:
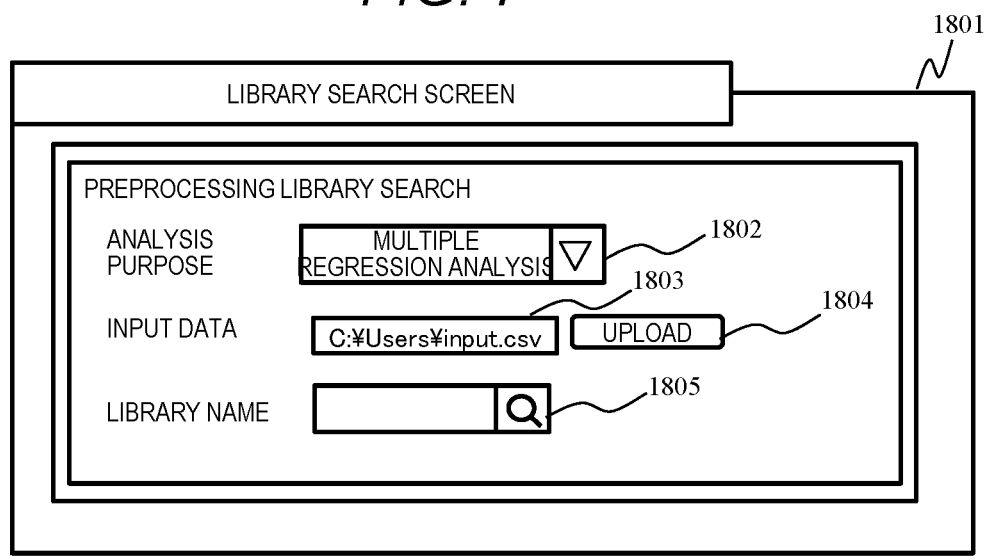
FIG. 7 is a diagram showing an example of a library search screen according to Embodiment 1.

FIG. 7 is a diagram showing an example of a library search screen according to Embodiment 1.

The library search screen 1801 includes an analysis purpose selection area 1802, an input data designation area 1803, an upload button 1804, and a library search designation area 1805.

The analysis purpose selection area 1802 is an area for selecting and inputting the purpose (analysis purpose) of a data analysis. Analysis purposes include, for example, a multiple regression analysis, a cluster analysis, or the like. The input data designation area 1803 is an area for inputting a path of data (input data: analysis target data) for the data analysis. The upload button 1804 is a button for uploading the data of the path input to the input data designation area 1803, to the computer 101. When the upload button 1804 is pressed, the CPU 112 of the terminal 111 uploads the input data of the path input to the input data designation area 1803, to the computer 101, and transmits the analysis purpose selected in the analysis purpose selection area 1802 to the computer 101. The library search designation area 1805 is an area for receiving an input of a search word for searching a library and an instruction of search. When the search word is input to the library search designation area 1805 and the search instruction is issued, the search word is transmitted to the computer 101, and from the computer 101 a search result of a library by the search word is returned.

Figure 8:
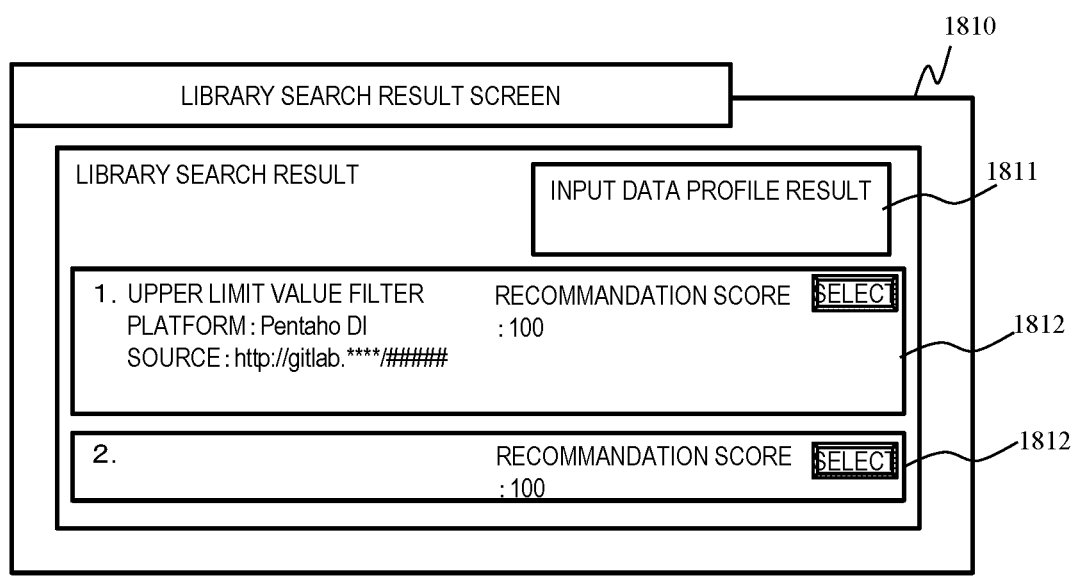
FIG. 8 is a diagram showing an example of a library search result screen according to Embodiment 1.

FIG. 8 is a diagram showing an example of a library search result screen according to Embodiment 1.

The library search result screen 1810 includes an input data profile result display area 1811 and one or more search result display areas 1812. In the input data profile result display area 1811, a statistical profile of the input data calculated by the computer 101 is displayed. As the statistical profile, for example, there is the information shown in FIG. 4.

In the search result display areas 1812, information relating to libraries searched in the computer 101 is displayed. The information relating to the libraries includes search orders (order of the library score) of the libraries, library names, recommendation scores calculated with respect to the libraries, library specifications, locations of library source files, or the like. Regarding the recommendation score, the library score may be used as it is, or a value obtained by performing predetermined processing with respect to the library score may be used. In addition, the selection button for instructing to install a data analysis application by selecting the displayed library may be displayed in the search result display area 1812. In a case where the selection button is displayed, the CPU 112 of the terminal 111 notifies the computer 101 of the information of the selected library. The computer 101 installs the data analysis application by the library in which the notification is received, and executes a data analysis with respect to the input data (execution target analysis data) designated at the time of the library search. For example, the search result display area 1812 may be arranged and displayed in order from the top of the library information having a high recommendation score. Further, the number of search result display areas 1812 to be displayed may be within a predetermined number. Here, extracting libraries based on the library scores and displaying the search result display area 1812 of the extracted libraries, or displaying the search result display area 1812 in the order of the library scores is an example of prioritizing and outputting information of a library with high effectiveness.

Next, a processing operation in the market place system 10 according to Embodiment 1 will be described.

First, entire processing in the computer 101 of the market place system 10 will be described.

Figure 9:
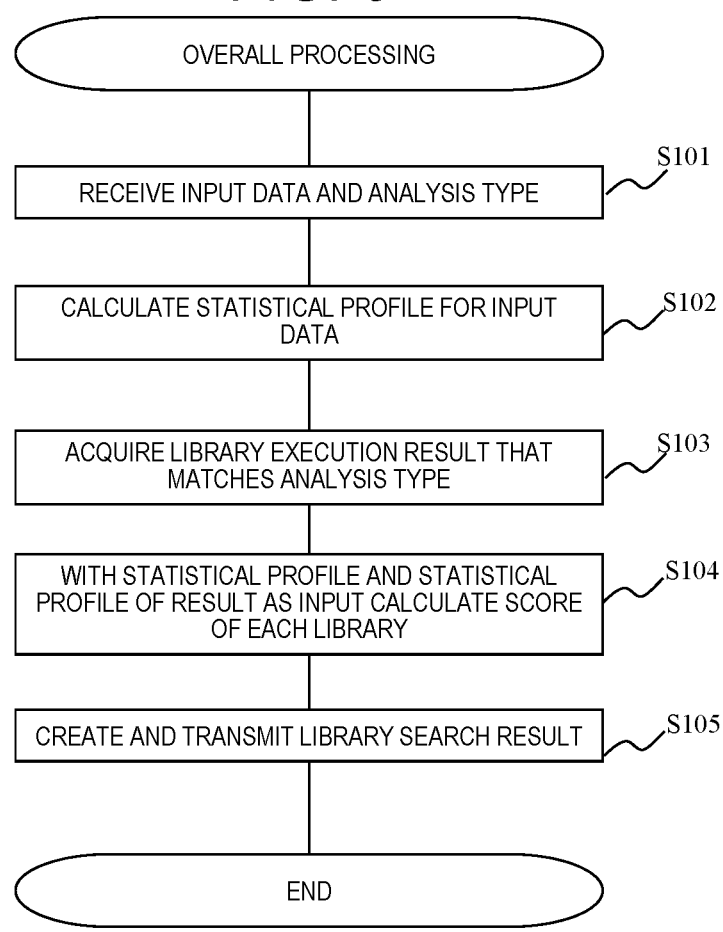
FIG. 9 is a flowchart of entire processing according to Embodiment 1.
Figure 10:
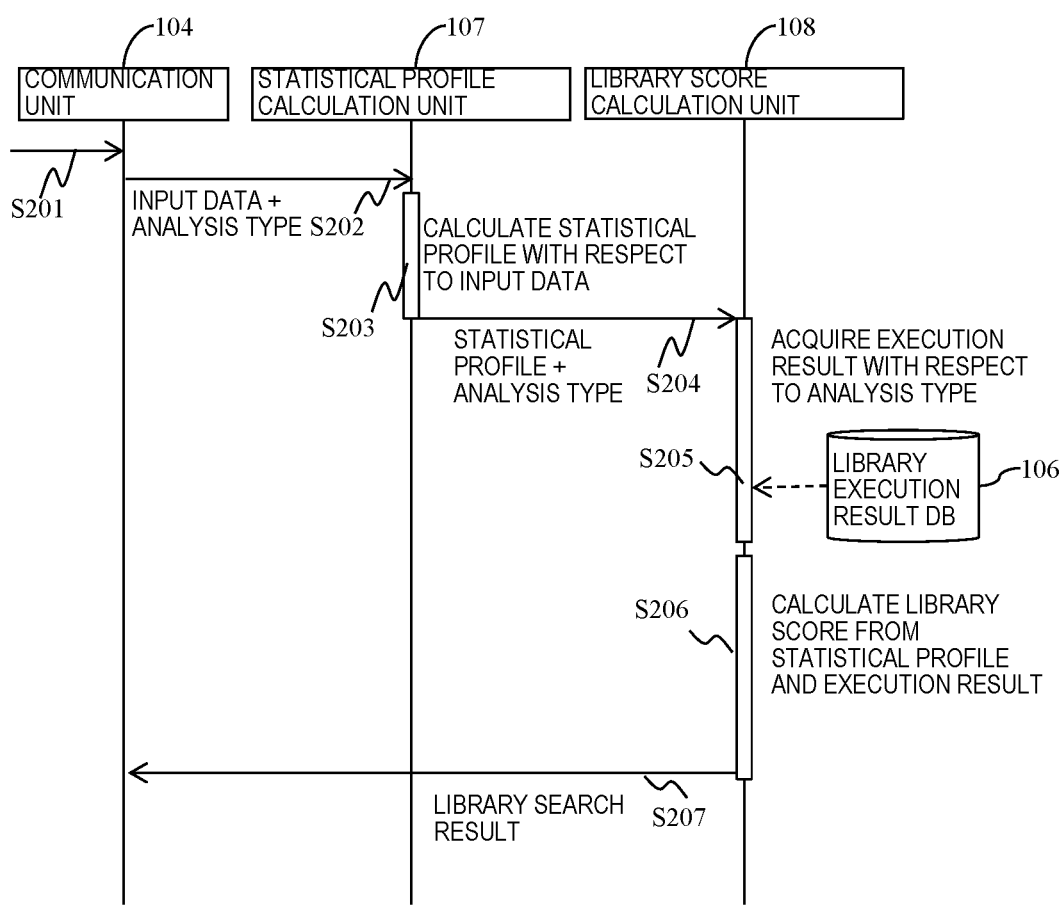
FIG. 10 is a sequence diagram of the entire processing according to Embodiment 1.

FIG. 9 is a flowchart of the entire processing according to Embodiment 1. FIG. 10 is a sequence diagram of the entire processing according to Embodiment 1.

In the terminal 111, when the path of the input data that is a data analysis object with respect to the library search screen 1801 as shown in FIG. 7 and an analysis type are input by a user 120, the input data corresponding to the path of the input data and the analysis type are transmitted from the terminal 111 to the computer 101 (S201).

When the input data and the analysis type are transmitted to the computer 101, the communication unit 104 of the computer 101 receives the input data and the analysis type (S201, S101), and passes the received input data and analysis type to the statistical profile calculation unit 107 (S202).

The statistical profile calculation unit 107 calculates a statistical profile for the received input data (S102, S203), and passes the calculated statistical profile and the received analysis type to the library score calculation unit 108 (S204).

The library score calculation unit 108 acquires a library execution result (entire or a part of the record) matching the analysis type from the library execution result DB 106 (S103, S205). Specifically, the library score calculation unit 108 issues a query to acquire the library execution result that matches the analysis type with respect to the library execution result DB 106, and receives a record corresponding thereto from the library execution result DB 106.

Subsequently, the library score calculation unit 108 calculates a score of each library by executing a calculation processing for calculating a library score based on the statistical profile and the statistical profile in the library execution result (S104, S206).

Subsequently, the library score calculation unit 108 creates a library search result 700 including the calculated library scores, creates data for the library search result screen 1810 based on the library search result 700, and passes the data to the communication unit 104 (S207). The communication unit 104 transmits the data for the library search result screen 1810 to the terminal 111, thereby causing the terminal 111 to display the library search result screen 1810 shown in FIG. 8 (S303, S105).

Next, the result accumulation processing according to Embodiment 1 will be described.

Figure 11:
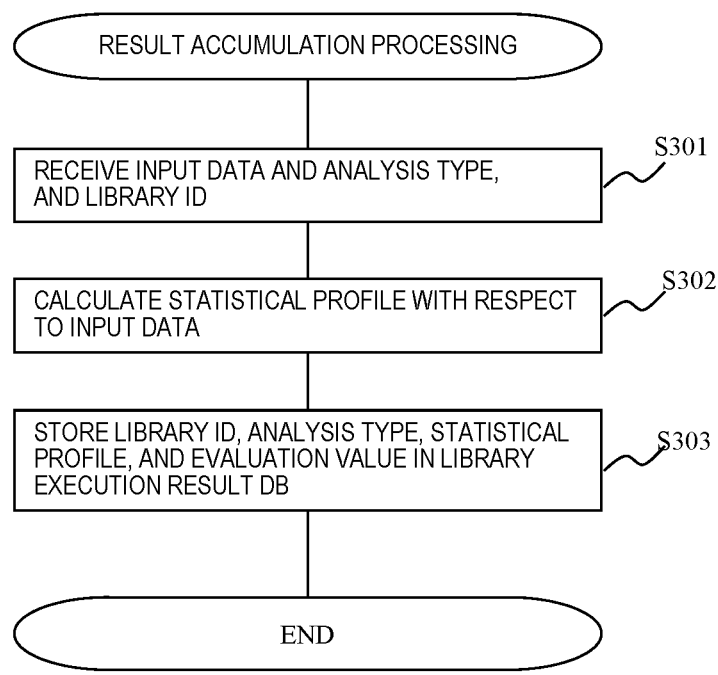
FIG. 11 is a flowchart of result accumulation processing according to Embodiment 1.

FIG. 11 is a flowchart of the result accumulation processing according to Embodiment 1.

First, the library execution unit 109 receives the input data (execution target analysis data) that is a data analysis object, the analysis type, and the library ID of the library to be utilized for the data analysis (S301). Note that the library execution unit 109 may apply the received input data to the library of the received library ID and perform the analysis processing. Next, the statistical profile calculation unit 107 calculates a statistical profile (input data statistical profile: execution target analysis data statistical profile) with respect to the input data (S302). Next, the library execution unit 109 stores the library ID, the analysis type, and the input data statistical profile calculated by the statistical profile calculation unit 107 in the library execution result DB 106 (S303). Note that in S303, an evaluation value may be stored in the evaluation value 507 of the record of the library execution result DB 106 by receiving an evaluation value with respect to the result of the data analysis by using the library from the user, or by determining an evaluation value based on the execution result by the library execution unit 109.

As a result, it is possible to register the library actually used and the statistical profile (execution target analysis data statistical profile) of the input data to which the library is applied in the library execution result DB 106 as actual information.

In Embodiment 1 described above, a statistical profile including one or more statistical values of the input data is calculated, a closeness between the input data and the data to which the library is applied can be quantified as the library score based on a closeness between the statistical profile with respect to the input data and the statistical profile result aggregated for each library, for example, the library score can be displayed on the library search result screen 1810. Since the library score indicates that it is a library applied to the input data having a similar distribution of data, it is easy to install a data analysis application with higher accuracy by using a library with a high score.

Embodiment 2

Next, Embodiment 2 will be described.

In the calculation processing for calculating the library score, Embodiment 2 is an example in which a closeness is taken into consideration between a business type and business task relating to the input data (business type/task) and a business type and business task of the analysis data where the library is applied (business type/task).

There is a case where results included in the library execution result DB 106 may include results of various business types and business tasks. For example, there is a case where an execution result of a library at a data analysis in a customer sales improvement policy plan business task in a convenience store industry is included or an execution result of a library at a data analysis in a parts stock elimination policy plan business task stored at a manufacturing base of a manufacturing company is included. The reason for the result information relating to these different business types and business tasks exist together in the library execution result DB 106, is that, as a data analysis application with respect to these business tasks, it is possible to think a case to use the same trend analysis library as a core analysis library, or it is possible to consider to apply the preprocessing library to be utilized for the business task of the customer sales improvement policy to the business task of the parts stock elimination policy which is a different business task.

However, in general, it is considered that reliability will be low with regard to an application result of a library in a completely different business task.

Therefore, in Embodiment 2, it is determined whether or not the result is a close business type and business task, and the determination result is utilized to specify the library score. The library execution result DB stores results of various business tasks of various business types. Further, when searching the library, library scores with higher credibility are calculated by calculating library scores taking account of the closeness of the business type and business task in addition to the statistical profile used in Embodiment 1.

In Embodiment 2, a field for storing a business type/task identifier is further added to each record of the library execution result DB 106. Here, the business type/task identifier is information that can specify a business type (execution business type) of a company related to data to which the data analysis application (library) is applied, and a business task (execution business task) to which the data analysis is applied, for example, if the business type of the company is a convenience store and the business task is "sales improvement", the business type/task identifier is "convenience store/sales improvement".

FIG. 12 is a configuration diagram of a business type/task closeness score table according to Embodiment 2.

A business type/task closeness score table 1000 is, for example, a table stored in the memory 103, and stores a score (business type/task closeness score, similarity degree information) indicating a closeness (similarity) between the business types and business tasks corresponding to two business type/task identifiers among a plurality of business type/task identifiers as each record.

The record of the business type/task closeness score table 1000 includes fields of a first application business type/task identifier 1001, a second application business type/task identifier 1002, and a business type/task closeness score 1003.

In the first application business type/task identifier 1001, one business type/task identifier is stored. In the second application business type/task identifier 1002, the other business type/task identifier is stored. In the business type/task closeness score 1003, a business type/task closeness score indicating a closeness between the business type and business task corresponding to the business type/task identifier stored in the first application business type/task identifier 1001 and the business type and business task corresponding to the business type/task identifier stored in the second application business type/task identifier 1002, is stored.

For example, a first line of the business type/task closeness score table 1000 indicates that the business type/task closeness score between "convenience store/sales improvement" and "manufacturing/stock elimination" is "20". Note that in the present embodiment, the higher the numerical value, the closer the business type/task is.

Figure 13:
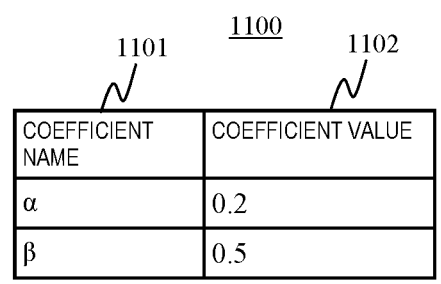
FIG. 13 is a configuration diagram of a library score calculation coefficient table according to Embodiment 2.

FIG. 13 is a configuration diagram of a library score calculation coefficient table according to Embodiment 2.

A library score calculation coefficient table 1100 is, for example, a table stored in the memory 103 and includes a record corresponding to one or more coefficients of an expression (2) used for calculating a library score to be described later. The record of the library score calculation coefficient table 1100 includes fields of a coefficient name 1101 and a coefficient value 1102. In the coefficient name 1101, a name of the coefficient used for calculation is stored. In the coefficient value 1102, a value of the coefficient of the coefficient name corresponding to the record is stored. The library score calculation coefficient table 1100 shown in FIG. 13 indicates that the coefficient value of the coefficient name "α" is "0.2" and the coefficient value of the coefficient name "β" is "0.5".

Figure 14:
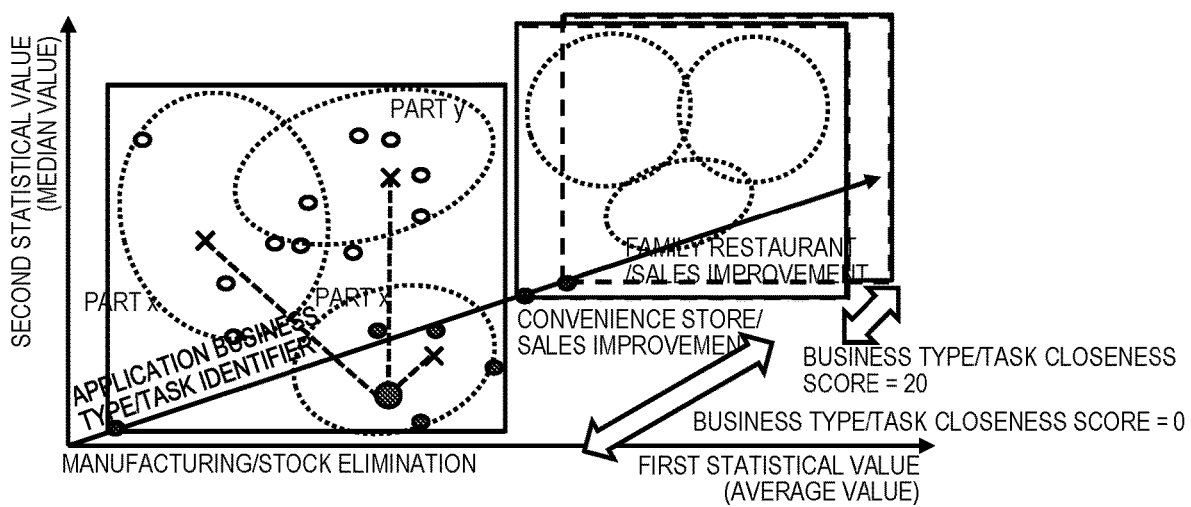
FIG. 14 is a diagram illustrating the business type/task closeness score and a method of calculating a library score according to Embodiment 2.

FIG. 14 is a diagram illustrating the business type/task closeness score and a method of calculating a library score according to Embodiment 2.

In a scatter diagram shown in FIG. 14, in addition to the two axes in the scatter diagram of FIG. 5 according to Embodiment 1, an axis relating to the application business type/task identifier is newly added. In FIG. 14, a statistical profile of a plurality of execution results, which is a predetermined analysis type (for example, "trend analysis") in the library execution result DB 106, and a statistical profile of the input data are plotted.

There are three application business type/task identifiers in the scatter diagram of FIG. 14, "manufacturing/stock elimination", "convenience store/sales improvement", and "family restaurant/sales improvement". Here, the closeness (similarity) of business type/task of each of "convenience store/sales improvement", "family restaurant/sales improvement", and "manufacturing/stock elimination" is shown in the business type/task closeness score table 1000. In other words, "convenience store/sales improvement" and "family restaurant/sales improvement" are a close business type/task (similarity is high), "manufacturing/stock elimination" and other business types/tasks are a distant business type/task (similarity is low).

Here, an example of a method of calculating a library score utilizing the business type/task closeness score by the library score calculation unit 108 will be described.

The library score calculation unit 108 acquires a business type/task closeness score between the business type/task identifier of the input data (for example, a business type/task identifier input from the user 120 of the terminal 111 (business task of the user and the purpose of business task)) and the business type/task identifier corresponding to the execution result of the library of the library execution result DB 106 from the business type/task closeness score table 1000. For example, "0" is acquired as a business type/task closeness score between "manufacturing/stock elimination" and "convenience store/sales improvement", and "20" is acquired as a business type/task closeness score between "convenience store/sales improvement" and "family restaurant/sales improvement".

Subsequently, when the library score specified in Embodiment 1 is set to $S_0$ and the acquired business type/task closeness score is set to $S_b$, the library score calculation unit 108 calculates a library score S by using a calculation expression shown in the expression (2).

$$S = \alpha S_0 + \beta S_b \quad (2)$$

Here, α and β are coefficients stored in the library score calculation coefficient table 1100 shown in FIG. 13.

The expression (2) in a case of using the coefficients shown in FIG. 13, the coefficient "α" is a linear coefficient with respect to a closeness $S_0$ of the statistical profile, the coefficient "β" is a linear coefficient with respect to the business type/task closeness score. When the value of α is 0.2 and the value of α is 0.5, it means that the business type closeness score $S_b$ has a greater influence on the library score than the closeness $S_0$ of the statistical profile. Note that by adjusting the value of the coefficient value 1102, the calculation result of the library score can be adjusted.

Note that the calculation expression of the library score utilizing the business type/task closeness score is not limited to the expression (2) using the linear sum as described above, and any expression, such as square root of sum of squares or sum of squares, may be used as long as the magnitude of each term has a positive correlation with the magnitude of the final library score.

Note that in the diagram shown in FIG. 14, an example is shown in which the application business type/task identifier is represented as one numerical value axis. However, the present invention is not limited to this, and the application business type/task identifier may be set to a plurality of numerical value axes.

The library score calculated by the library score calculation unit 108 according to Embodiment 2 has a larger score based on the statistical profile. The larger the business type/task closeness score of the library, the larger the value. By displaying the library based on the library score, a library score taking into consideration the closeness of the business type/task is calculated, a library with a closer the business type/task result is displayed as higher rank, and the search accuracy of the library can be improved.

Embodiment 3

Next, Embodiment 3 will be described.

In Embodiment 1 and Embodiment 2, since the library score is specified based on the execution result included in the library execution result DB 106, when the number of execution results (amount of information: specifically, number of records) included in the library execution result DB 106 is small, the calculation expressions and the like in Embodiment 1 and Embodiment 2 may not work well. Therefore, in Embodiment 3, a technique is provided that allows an appropriate library to be selected without any problem even when the number of execution results of the library execution result DB 106 is small. Specifically, in Embodiment 3, condition (rule) applicable to the core analysis library as a core of the data analysis is described, and a library is selected according to the rule. Here, it is preferable that the rule is created by a skilled data scientist. As a condition to which the core analysis library can be applied, for example, it is a rule concerning at least one of a condition to be satisfied by an input data and a condition to be satisfied by an output data. The rule is stored in the memory 103.

In Embodiment 3, in a case where the condition of the core analysis library cannot be satisfied with a single library, the library score calculation unit 108 recursively searches the library so as to satisfy the condition by using a plurality of libraries in an overlapping manner. For example, a preprocessing library is searched recursively, a statistical profile of data output by the preprocessing library is calculated, a list of used library is created by repeating such processing as to determine whether or not the data satisfies the condition to be satisfied by the input data of the core analysis library, and the list of the library is output.

The memory 103 of the computer 101 according to Embodiment 3 further stores a core analysis library correspondence table 1300, a core analysis library application rule table 1400, and a library effect DB 1500.

FIG. 15 is a configuration diagram of a core analysis library correspondence table according to Embodiment 3.

The core analysis library correspondence table 1300 is a table for managing a core analysis library that can be used as each analysis type, and manages a record including fields of an analysis type 1301 and a core analysis library ID 1302. The analysis type is stored in the analysis type 1301. In the core analysis library ID 1302, an ID (core analysis library ID) of a core analysis library applicable to a data analysis of an analysis type corresponding to the record is stored.

For example, the core analysis library correspondence table 1300 in FIG. 15 shows that core analysis libraries "R multiple regression analysis library" and "Python cluster analysis library" can be used for the analysis type "trend analysis".

FIG. 16 is a configuration diagram of a core analysis library application rule table according to Embodiment 3.

The core analysis library application rule table 1400 is a table for holding the conditions (rules) to be satisfied by the input data and the output data in order to apply the core analysis library. The core analysis library application rule table 1400 stores a record having fields of a core analysis library ID 1401, an input data condition 1402, and an output data condition 1403.

The core analysis library ID is stored in the core analysis library ID 1401. In the input data condition 1402, a condition (input data condition) of data to be input to the core analysis library corresponding to the record is stored. In the output data condition 1403, a condition (output data condition) of necessary data after executing the core analysis library corresponding to the record is stored.

For example, in the example shown in FIG. 16, the input data condition is "|[average value]–[median value]–<[standard deviation]" and the output data condition is "number of overlapping lines=0", with respect to the library whose core analysis library ID is "R multiple regression analysis". In this case, it means that, as a condition necessary for applying the core analysis library "R multiple regression analysis" to the data analysis application, there are conditions that an absolute value of a difference between the "average value" and the "median value" need to be smaller than the "standard deviation" with respect to the statistical profile of the input data, and "the number of overlapping lines need to be 0" with respect to the statistical profile of the output data.

FIG. 17 is a configuration diagram of a library effect database according to Embodiment 3.

The library effect database 1500 manages the statistical profile of data input to a library (preprocessing library, post-processing library, or the like) and the statistical profile of data output from the library. The library effect database 1500 stores a record including fields of a library ID 1501, an input data statistical profile 1502, an output data statistical profile 1503, and a predicted effect expression 1504, for each library.

The library ID is stored in the library ID 1501. In the input data statistical profile 1502, a statistical profile of data input to the library corresponding to the record is stored. In the output data statistical profile 1503, a statistical profile of data output from the library corresponding to the record is stored. In the predicted effect expression 1504, an expression (influence information) of the effect of the library corresponding to the record on the statistical value of the input data, that is, an expression of the difference between the statistical value of the input data and the statistical value of the output data, is stored.

According to the record of the library effect database 1500, the statistical profile of the data input to the library "upper limit filter" has an average value of 10 and a median value of 15, and the statistical profile of the data output from the library has an average value of 10 and a median value of 12. Further, it can be seen that the predicted effect expression is "median value (input)–median value (output)=3", that is, it becomes "3" when subtracting the median value of the output from the median value of the input. The predicted effect expression can be obtained by referring to the statistical profile of the input data and the statistical profile of the output data. According to the predicted effect expression, it is possible to estimate the statistical profile of the output data by inputting the input data to the library.

Next, a processing operation in the market place system 10 according to Embodiment 3 will be described.

First, entire processing in the computer 101 of the market place system 10 will be described.

FIG. 18 is a flowchart of the entire processing according to Embodiment 3. Note that the same reference signs are given to the same parts as the flowchart of the entire processing shown in FIG. 9 according to Embodiment 1, and redundant explanations are omitted.

In step S401, the statistical profile calculation unit 107 determines whether or not the number of records in the library execution result DB 106 is equal to or greater than a predetermined number (for example, 100) (S401).

As a result, when the number of records in the library execution result DB 106 is equal to or greater than the predetermined number (S401: YES), since it means that the execution results of a sufficient accumulated amount are stored in the library execution result DB 106, the statistical profile calculation unit 107 advances the processing to step S103.

On the other hand, when the number of records in the library execution result DB 106 is smaller than the predetermined number (S401: NO), since it means that the execution results of the sufficient accumulated amount are not stored in the library execution result DB 106, the statistical profile calculation unit 107 executes rule determination processing (see FIG. 19) (S402).

Figure 19:
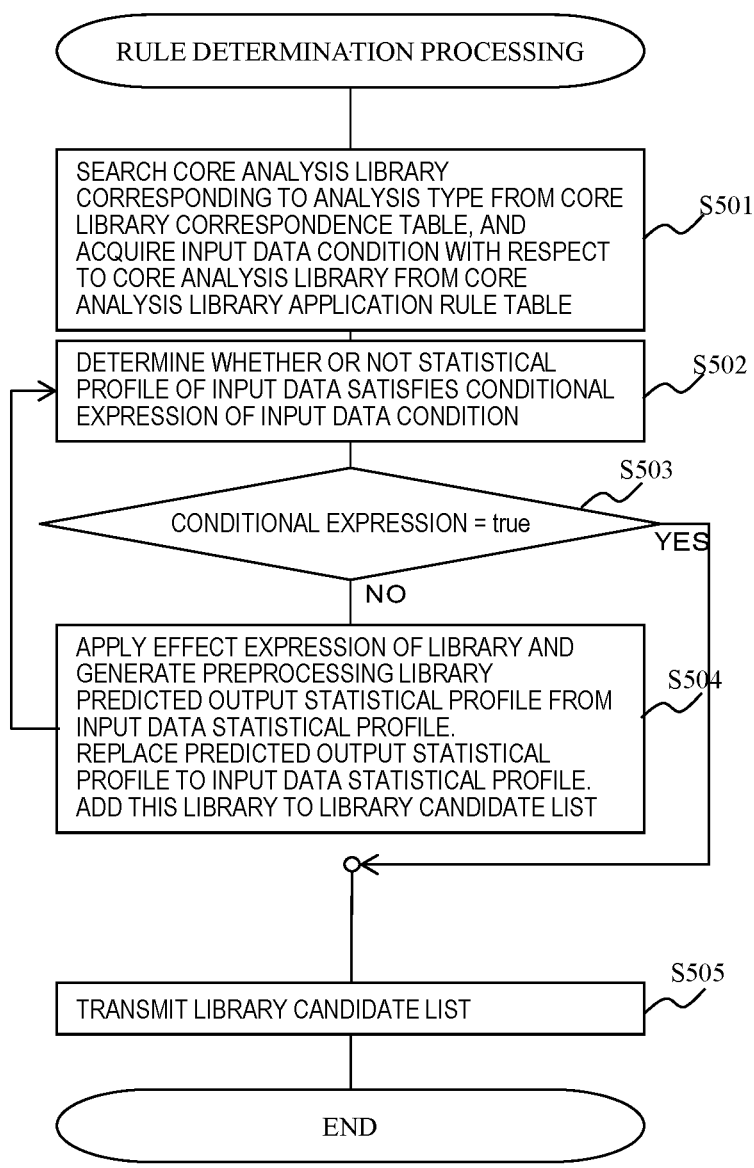
FIG. 19 is a flowchart of rule determination processing according to Embodiment 3.

FIG. 19 is a flowchart of the rule determination processing according to Embodiment 3.

The rule determination processing is processing corresponding to step S402 in FIG. 18.

First, the library score calculation unit 108 acquires the core analysis library corresponding to the analysis type from the core library correspondence table 1300, and acquires the input data condition corresponding to the core analysis library acquired from the core analysis library application rule table 1400 (S501). Note that when there are a plurality of core analysis libraries corresponding to the analysis type, all the core analysis libraries may be acquired, and an input data condition corresponding to the core analysis libraries may be acquired.

Subsequently, the library score calculation unit 108 determines whether or not the statistical profile with respect to the input data calculated in step S102 satisfies the conditional expression of the input data condition (S502).

As a result, when the conditional expression is satisfied (S503: YES), the library score calculation unit 108 creates data for displaying a list of candidate of the library (library candidate list) at that time on the library search result screen 1810, and causes the terminal 111 to display the library search result screen 1810 including the library candidate list by transmitting the data, which is created by the communication unit 104, to the terminal 111 (S505).

On the other hand, when the conditional expression is not satisfied (S503: NO), the library score calculation unit 108 specifies an applicable library, refers to the library effect DB 1500 and acquires a predicted effect expression by executing the specified library, applies the predicted effect expression to the statistical profile of the input data to generate a statistical profile (predicted output statistical profile) predicted as output data obtained when the specified library is applied to the input data, adds the library to the library candidate list, and advances the processing to step S502. In the next step S502, the predicted output statistical profile is replaced by the statistical profile of the input data, and similar processing is performed.

According to the processing in steps S502 to S504, one or more libraries to be applied to the statistical profile of the input data is added to the library candidate list, and in the library candidate list output in step S505 via step S503, one or more libraries that affect the statistical profile of the input data so as to satisfy the input data condition of the core analysis library are included.

Next, regarding the rule determination processing in FIG. 19, for example, a case where the core analysis library correspondence table 1300, the core analysis library application rule table 1400, and the library effect DB 1500 have the contents shown in FIGS. 15 to 17 will be described as an example.

Assuming that in step S101, the analysis type "trend analysis" is received, and in step S102, it is calculated that the statistical profile of the input data is "average value: 10, median value: 17, standard deviation: 5".

In step S501, the library score calculation unit 108 specifies the "R multiple regression analysis library" and the "Python cluster analysis library" as the core analysis library corresponding to the "trend analysis". In this case, it means that in the library storage unit 105, these two types of libraries are held as the core analysis library for the trend analysis.

Next, referring to the core analysis library application rule table 1400, the library score calculation unit 108, for example, acquires the "|[average value]−[median value]|< [standard deviation]" as a condition relating to the input data condition with respect to the "R multiple regression analysis library". Next, in step S502, the library score calculation unit 108 obtains "|10−17|<5" by applying the statistical profile of the input data to the conditional expression, and determines that the statistical profile does not satisfy the conditional expression (the conditional expression is false). The determination result means that the statistical profile of the input data does not satisfy the conditional expression since the median value is relatively large with respect to the average value.

As a result, the processing advances to step S504, and processing of searching for a necessary preprocessing library is performed.

In step S504, the library score calculation unit 108 acquires the "upper limit filter" and the predicted effect expression "median value (input)−median value (output)=3" from the library effect DB 1500. It means that the library "upper limit filter" is predicted to play a role of lowering the median value of the data. The library score calculation unit 108 adds the acquired "upper limit filter" to the library candidate list. Note that, by subtracting the evaluation value from the initial evaluation value (maximum evaluation value) each time the processing step S504 is executed, the evaluation value in the data analysis of the library of the library candidate list may be determined.

By inputting the statistical profile of the input data to the predicted effect expression, the library score calculation unit 108 assures a predicted value (in this case, the predicted value of the median value of the output data becomes 17−3=14) when the library is applied.

Next, in step S502, the library score calculation unit 108 obtains "|10−14<5" by applying the statistical profile of the output data, which is obtained by applying the library acquired in step S504 with respect to the input data, to the conditional expression, and determines that the statistical profile satisfies the conditional expression (the conditional expression is true).

As a result, the processing advances to step S505, and the library score calculation unit 108 creates data for displaying the library candidate list including the "upper limit filter" at this point on the library search result screen 1810 and transmits the data, which is created by the communication unit 104, to the terminal 111. In this way, the "upper limit filter" is displayed on the library search result screen 1810 as a candidate library in the terminal 111. Note that the processing similar to the above may be executed for the "Python cluster analysis library".

In the above rule determination processing, an example for searching a candidate of a preprocessing library is shown, and a candidate of a post-processing library may also be searched. For example, the library score calculation unit 108 may acquire a core analysis library corresponding to the analysis type received from the core library correspondence table 1300, may acquire an output data condition corresponding to the core analysis library acquired from the core analysis library application rule table 1400, may specify a library having a predicted effect expression that matches the output data condition from the library effect DB 1500, and may add the library to the library candidate list as a candidate of the post-processing library. Specifically, for example, when the core analysis library is the R multiple regression analysis, the library score calculation unit 108 acquires a condition (the number of overlapping lines=0) of the output data condition 1403 of the record corresponding to the R multiple regression analysis of the core analysis library application rule table 1400 in FIG. 16. Next, referring to the library effect DB 1500, the library score calculation unit 108 may search a library (in this example, deduplication filter) that can make the statistical profile of the output data satisfies the output data condition and include the library obtained by the search in the library candidate list as a candidate of post-processing library.

According to Embodiment 3, even when there is only a small number of results in the library execution result DB, it is possible to provide a library suitable for the data analysis to the user.

Note that the present invention is not limited to the above-described embodiments, and can be appropriately modified and implemented without departing from the spirit of the present invention.

For example, in Embodiment 1, a library score is calculated based on the distance between the input data statistical profile and the gravity center of the statistical profile group of the past input data to which the library is applied. However, the present invention is not limited thereto, for example, the computer 101 may include a functional unit in which a machine learning (for example, Q learning) is performed so as to calculate a library score with a statistical profile of the input data as an input, and the library score may be calculated by inputting the statistical profile of the input data of an analysis target to the functional unit.

In Embodiment 3, when there is only a small number of results in the library execution result DB, the rule determination processing is performed to detect a candidate library. However, the present invention is not limited thereto and even in a case where there are many results in the library execution result DB, the rule determination processing may be performed to detect a candidate library. Further, the rule determination processing may be performed to detect a candidate library according to an instruction from the user. In this way, it is possible to detect suitable library candidates from a viewpoint different from the viewpoint based on the library execution result.

Further, in the above embodiments, a part or all of the processing that the CPU has performed may be performed by a hardware circuit. Further, the program in the above embodiments may be installed from a program source. The program source may be a program distribution server or a storage medium (for example, a portable storage medium).

REFERENCE SIGNS LIST

10: market place system
101, 110: computer
102: CPU
103: memory
104: communication unit
105: library storage unit
106: library execution result DB
107: statistical profile calculation unit
108: library score calculation unit
109: library execution unit
111: terminal

The invention claimed is:

1. A library search apparatus for searching a library to be used for an application to be used for a data analysis, the apparatus comprising:
a storage device that stores information; and
a processor unit that is connected to the storage device,
wherein the storage device stores execution result information including information for specifying a library utilized for a data analysis in the past and a past analysis data statistical profile which is a statistical profile for past analysis data on which the data analysis was performed by using the library,
wherein the processor unit specifies an analysis target data statistical profile which is a statistical profile for analysis target data that is a data analysis object, specifies an effectiveness degree indicating effectiveness of utilization of the analysis target data for the data analysis with respect to the library based on a similarity between the past analysis data statistical profile of the past analysis data on which the data analysis was performed by using the library and the analysis target data statistical profile, and preferentially outputs information relating to a library where the effectiveness is high based on the effectiveness degree,
wherein the execution result information further includes information on an analysis type obtained by the data analysis by using the library, and
wherein the processor unit receives a designation of the analysis type of the data analysis from a user, extracts execution result information of the library corresponding to the analysis type of which designation has been received, from the execution result information, and specifies the effectiveness degree indicating the effectiveness of utilization of the analysis target data for the data analysis with respect to the library corresponding to the extracted execution result information.

2. The library search apparatus according to claim 1, wherein the processor unit specifies the effectiveness degree based on a distance between a gravity center position of a set of the past analysis data statistical profile of a plurality of past analysis data on which an analysis was performed by using the same library and a position of the analysis target data statistical profile.

3. The library search apparatus according to claim 1,
wherein the execution result information further includes an evaluation value relating to an evaluation in execution of the data analysis by using the library, and
wherein the processor unit utilizes the evaluation value for specifying the effectiveness degree.

4. The library search apparatus according to claim 1,
wherein the execution result information further includes an execution business type which is a business type of a user who performed the data analysis by using the library and an execution business task which is a business task on which the data analysis is performed, and
wherein the processor unit receives a designation of a user business type which is a business type of a user who performs the data analysis and a business task target which is a business task as a target to perform the analysis, and specifies the effectiveness degree of utilization of the analysis target data for the data analysis with respect to the library based on the similarity between the past analysis data statistical profile of the past analysis data on which the data analysis was performed by using the library and the analysis target data statistical profile, and a similarity between the execution business type and the execution business task, and the user business type and the business task target.

5. The library search apparatus according to claim 4, wherein the storage device stores similarity degree information indicating a similarity degree between each of a plurality of business types and business tasks, and wherein the processor unit specifies the similarity between the execution business type and the execution business task, and the user business type and the business task target based on the similarity degree information.

6. The library search apparatus according to claim 1, wherein the storage device stores an input data condition which is a condition relating to a statistical profile with respect to data input for a plurality of libraries, and wherein the processor unit specifies a library in which the analysis target data statistical profile satisfies the input data condition, and outputs information relating to the specified library.

7. The library search apparatus according to claim 6, wherein when an accumulated amount of the execution result information stored in the storage device is smaller than a predetermined amount, the processor unit specifies a library in which the analysis target data statistical profile satisfies the input data condition and outputs information relating to the specified library.

8. The library search apparatus according to claim 6, wherein when a designation is made by the user, the processor unit specifies a library in which the analysis target data statistical profile satisfies the input data condition and outputs information relating to the specified library.

9. The library search apparatus according to claim 6, wherein the storage device stores influence information which is information indicating a change given to the statistical profile of the input data when the library is actually utilized, and wherein the processor unit specifies a library which changes the analysis target data statistical profile so as to satisfy the input data condition based on the influence information when there is no library in which the analysis target data statistical profile satisfies the input data condition, and outputs information relating to the library.

10. The library search apparatus according to claim 1, wherein the processor unit receives a designation of execution target analysis data for executing the data analysis and a designation of a library actually to be utilized in the data analysis with respect to the execution target analysis data, specifies an execution target analysis data statistical profile which is a statistical profile of the execution target analysis data, and adds the execution target analysis data statistical profile and information specifying the library to the execution result information.

11. The library search apparatus according to claim 10, wherein the processor unit performs the data analysis of the execution target analysis data by utilizing the designated library and outputs an analysis result of the data analysis.

12. The library search apparatus according to claim 1, wherein the processor unit arranges the information relating to the library in descending order of the effectiveness of the library, and displays the information.

13. A library search system comprising:
a terminal; and
a library search apparatus for searching a library to be used for an application to be used for a data analysis,
wherein the terminal stores analysis target data that is a data analysis object,
wherein the library search system includes a storage device that stores information and a processor unit that is connected to the storage device,
wherein the storage device stores execution result information including information for specifying a library utilized for a data analysis in the past and a past analysis data statistical profile which is a statistical profile for past analysis data on which the data analysis was performed by using the library,
wherein the processor unit acquires the analysis target data from the terminal, specifies an analysis target data statistical profile which is a statistical profile for the analysis target data, specifies an effectiveness degree indicating effectiveness of utilization of the analysis target data for the data analysis with respect to the library based on a similarity between the past analysis data statistical profile of the past analysis data on which the data analysis was performed by using the library and the analysis target data statistical profile, and preferentially outputs information relating to a library where the effectiveness is high to the terminal based on the effectiveness degree,
wherein the execution result information further includes information on an analysis type obtained by the data analysis by using the library, and
wherein the processor unit receives a designation of the analysis type of the data analysis from a user, extracts execution result information of the library corresponding to the analysis type of which designation has been received, from the execution result information, and specifies the effectiveness degree indicating the effectiveness of utilization of the analysis target data for the data analysis with respect to the library corresponding to the extracted execution result information.

14. A library search method by a library search apparatus for searching a library to be used for an application to be used for a data analysis, the method comprising:
storing execution result information including information for specifying a library utilized for a data analysis in the past and a past analysis data statistical profile which is a statistical profile for past analysis data on which the data analysis was performed by using the library, wherein the execution result information further includes information on an analysis type obtained by the data analysis by using the library;
receiving a designation of the analysis type of the data analysis from a user;
extracting execution result information of the library corresponding to the analysis type of which designation has been received, from the execution result information;
specifying an analysis target data statistical profile which is a statistical profile for analysis target data that is a data analysis object;
specifying an effectiveness degree indicating effectiveness of utilization of the analysis target data for the data analysis with respect to the library corresponding to the extracted execution result information based on a similarity between the past analysis data statistical profile of the past analysis data on which the data analysis was performed by using the library and the analysis target data statistical profile; and preferentially outputting information relating to a library where the effectiveness is high based on the effectiveness degree.

\* \* \* \* \*